Sept. 17, 1968          G. F. ROSS          3,402,370

PULSE GENERATOR

Filed Nov. 30, 1965          2 Sheets-Sheet 1

INVENTORS
GERALD F. ROSS

BY Harry A. Herbert Jr.
Robert Kern Duncan

ATTORNEYS

Sept. 17, 1968  G. F. ROSS  3,402,370

PULSE GENERATOR

Filed Nov. 30, 1965  2 Sheets-Sheet 2

INVENTORS
GERALD F. ROSS
BY Harry A. Herbert Jr,
Robert Kern Duncan
ATTORNEYS

United States Patent Office 3,402,370
Patented Sept. 17, 1968

3,402,370
PULSE GENERATOR
Gerald F. Ross, Lexington, Mass., assignor to the United States of America as represented by the Secretary of the Air Force
Filed Nov. 30, 1965, Ser. No. 510,717
3 Claims. (Cl. 333—20)

ABSTRACT OF THE DISCLOSURE

A very narrow pulse generator in which a step waveform is applied from a matched source to a TEM transmission line that has a shorted stub of characteristic impedance one-half that of the line connected intermediate its ends. The pulse produced across a matched load at the output of the line has a duration equal to the round trip delay of the studs.

---

The transient response of a linear network may be mathematically derived from the homogeneous solution of the linear equations relating the output response of the network to the excitaition. Mathematically, this corresponds to the response of the network when the input excitation is zero. Thus, the actual transient response is independent of the particular excitation chosen. In practice, some known excitation must be provided in order to display this transient phenomena. The actual choice of excitation may thus be chosen for convenience. A convenient choice is one which allows the transient phenomena to be easily separated from the forced or steady-state response, thereby allowing the build-up time of the device under examination to be easily determined.

When considering the response of passive coaxial components, a particularly simple choice of test waveform is an impulse function. This is attributed to the fact that the response of a coaxial network to an impulse is a train of impulses of weighted amplitude dependent on the particular values of discontinuities and terminations within the structure. But the concept of an impulse voltage is an abstraction of a mathematically convenient concept, and no physical device can actually generate such a waveform in a formal sense, namely, infinite height, zero duration, and finite energy. It is well known that for testing coaxial devices a narrow pulse can be used as an equally convenient testing waveform if the time duration of the pulse is sufficiently narrow.

Video pulse generators are commercially available produce pulse widths as small as 1 nanosecond, and rise times as good as 0.8 nanosecond. If the use of this test waveform is considered for testing a coaxial hybrid which has been designed to operate in the UHF region, say 200 mc., then the distance between junctions within the hybrid, which is one-quarter wavelength at 200 mc., would correspond to a 10-nanosecond round trip delay in air dielectric between responses. With a 1-nanosecond input pulse, the resulting train of pulses could easily be resolved in amplitude and time. However, if a 1-nanosecond pulse were used with a coaxial hybrid designed to operate at 1 gc., the resulting train of pulses would be ideally separated by only 1 nanosecond and would cause overlap with: (1) any residues generated by the video pulse generator and, (2) secondary reflections within the hybrid. In either case, the use of a 1-nanosecond pulse generator is considered marginal if easily interpretable results are desired. Thus it is an object of this invention to provide a system that will generate pulses having durations of small fractions of a nanosecond.

It is another object of the present invention to provide a passive system that will generate a fraction of a nanosecond pulse when driven by a step generator.

It is another object of the present invention to provide an extremely narrow pulse generating system wherein the length of the pulse width may be readily determined and adjusted.

Other objects and advantages of the invention will become apparent from the following description when considered in connection with the accompanying drawings, wherein.

Figure 1:
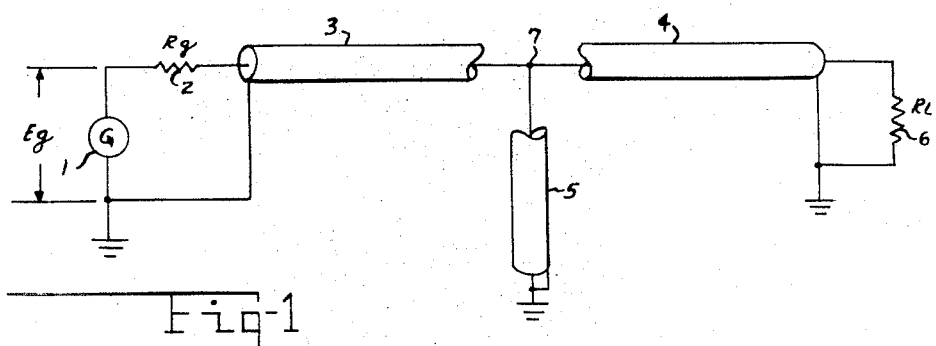
FIG. 1 is a schematic representation of an embodiment of the invention using coaxial TEM mode elements.
Figure 3:
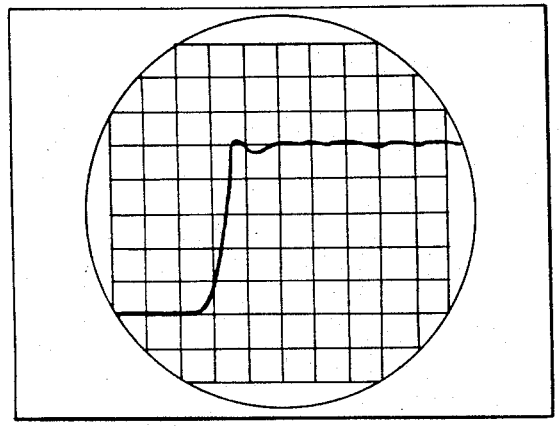
FIG. 3 is a picture of an oscillogram of a step input signal.

Referring to FIG. 1, an embodiment of the invention is shown using coaxial cable elements operating in transverse-electromagnetic (TEM) mode. Step function generator 1 having an internal impedance 2 generates a voltage step $E_g$ which is applied through internal impedance 2 to the input of the pulse forming apparatus. Commercially available "unit step" generators are available whose output is a very long video pulse of exceptionally fast rise time. Typical characteristics of such instruments are, rise times of approximately 0.1 nanosecond with less than five-percent overshoot and ringing down to one-half percent in two nanoseconds. FIG. 3 is a picture of an oscillogram of the waveform of the output pulse of such an instrument. The scale of the grid is 0.2 nanosecond per division. In the operation of this invention the rise time of the unit-stp impulse is critical in the determination of the minimum length of a generated output pulse since the width of the output pulse will necessarily be limited by the rise time of the step generator. The length of the video pulse from the step generator is not critical and may be quite long compared to the generated pulse.

By way of ilustration, a specific embodiment will be set forth in connection with FIG. 1. Step generator 1, having an internal impedance 2 of fifty ohms, generates a unit step $V_i$ at the input to the coaxial transmission line 3 which has a characteristic impedance of fifty ohms. In this particular embodiment coaxial lines 3 and 4 are both fifty-ohm impedance cables of arbitrary length. A short circuited stub 5 of twenty-five ohm (characteristic impedance) coaxial cable of electrical length equal to one-half of the desired pulse width to be generated is connected at junction point 7. The stepped input wave propagates to the stub cable junction and a voltage step of one-half of the original applied voltage reflects back into the generator, where it is absorbed. Also one-half the applied voltage propagates toward the load 6 and, in addition, goes separately down the stub. The latter wave is reflected by the short circuited stub as a reversed phase wave back to the terminal point juncture 7. At the junction this reflected wave "sees" two fifty ohm cables in parallel. Since this looks like a load matched to the twenty-five ohm stub cable, the reflected wave propagates undiminished in amplitude both ways, i.e., to the generator 1, and also toward the output load 6. As this reflected wave starts propagating toward the load it subtracts from the original passing step wave form effectively cancelling it, and thus terminating the length of the output pulse, leaving only that portion of the priorly passed wave that was propagating down the coaxial cable 4, before the reflection of the pulse from the stub, to emerge as an output pulse to the load 6 connected at the output connection of the coaxial cable.

Figure 2:
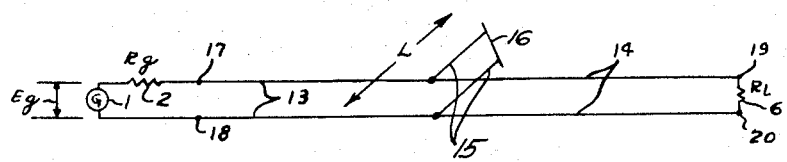
FIG. 2 is a schematic representation of an embodiment of the invention using strip transmission lines.

Another embodiment of the invention is shown schematically in FIG. 2. Here the interconnection of TEM mode coaxial lines have been replaced with the topological equivalent, that is, strip transmission lines. Again to illustrate a specific embodiment step wave generator 1 has an internal impedance 2 of fifty ohms. Open wire transmission line section 13 has a characteristic impedance of fifty ohms, as has section 14. Stub line 15 shorted at 16 has a characteristic impedance of twenty-five ohms and a length electrically equivalent to one-half the desired output pulse width.

By way of further explanation of these embodiments consider the shorted stub section of twenty-five ohm line 15 to have a length L. Then when generator 1 develops a unit step $E_g$ the waveform at the load 6 will be a delayed pulse of width $2L/C$, where C is the speed of electrical propagation on the medium of the stub line. Since the first fifty ohm line section 13 is matched to the generator, an incident step voltage, as shown in FIG. 3, propagates down the line toward the stub junction. This input voltage step impressed on terminals 17 and 18 has an amplitude $V_i$. When this incident step voltage reaches the stub junction, a reflected wave of amplitude $V_i/2$ is reflected back to the generator and is totally absorbed by the source impedance of the generator, but at the same time it effectively lowers the step voltage at the stub juncture to $V_i/2$ thus the wave tending to travel on to the load would be a step function of amplitude $V_i/2$; the same voltage wave travels down the twenty-five ohm line 15. When the wave travelling in the stub reaches the short circuit termination 16, a reflected wave of $V_i/2$ is produced and travels back toward the junction. The time required for the wave to travel the stub length L and be reflected to the connection with the fifty-ohm line is designated T. (Obviously T is twice the one-way transit time of propagation in the stub.) The reflective wave coming out of the stub sees at the junction with lines 13 and 14 two fifty-ohm lines in parallel (i.e. a perfect match) so all of this wave (that is the total value of the wave) travels simultaneously toward the impedance 6 of output load $R_L$ and toward the step generator 1 (having impedance 2). The wave travelling toward the output terminals 19 and 20 connecting the load is of the proper amplitude and sign to completely conceal (i.e. cancel) the positive step $V_i/2$ that is tending to travel to the output terminals. Thus, the output at terminals 19 and 20 is a short pulse whose duration is determined by the round trip delay in the short circuited stub. Stated differently, the output pulse that gets passed to the load is that portion of the step wave that passed the juncture point of the stub before the cancelling wave came up out of the stub section.

Figure 4:
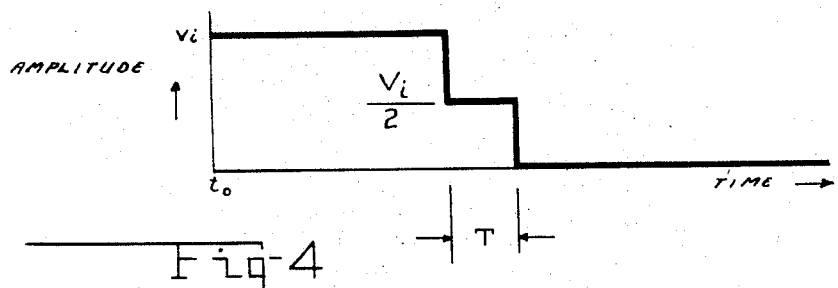
FIG. 4 is a representative picture of the signal on the input line.

An idealized sketch of the waveform on the input line 13, or coaxial cable 3, is shown in FIG. 4. The unit input step $V_i$ is impressed on the line at $t_0$. When the step encounters the stub juncture the amplitude decreases to $V_i/2$ as previously explained, and after the reflected wave emerges from the stub the remainder of the step wave is effectively terminated (cancelled) and the voltage on the input line drops to zero for the remainder of the step with all the remaining energy from the generator being absorbed in $R_g$ its internal resistance 2. During the round-trip transit time of the step pulse in the stub T the voltage remains as shown at $V_i/2$.

Figure 5:
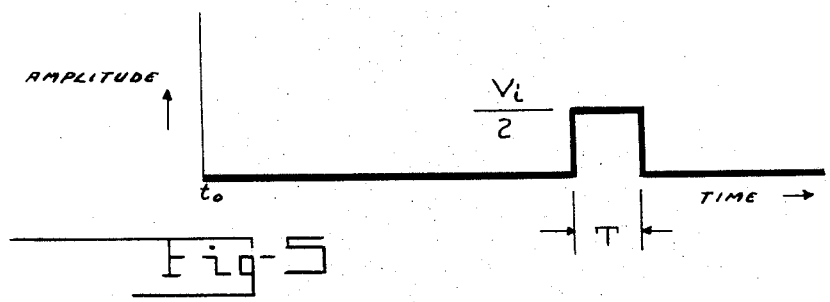
FIG. 5 is a representative picture of the signal on the output line.

FIG. 5 shows an idealized waveform of the generated pulse as it travels down the output line 14, or coaxial cable 4, to the load 6.

It is to be understood that load 6 represents the various pieces of microwave equipment on which the response to the extremely short pulse generated by this invention is to be tested. It is also to be understood that the specific values of impedances that have been set forth are merely to describe specific embodiments. The impedance values are relative; the requirements being only that the generator source impedance, the load impedance, the input TEM mode element, and the output TEM mode element be approximately equal; and that the shorted stub element have approximately one-half the value of that impedance. It is also apparent that the width of the output pulse may readily be adjusted by physically lengthening or shortening the stub line.

Figure 6:
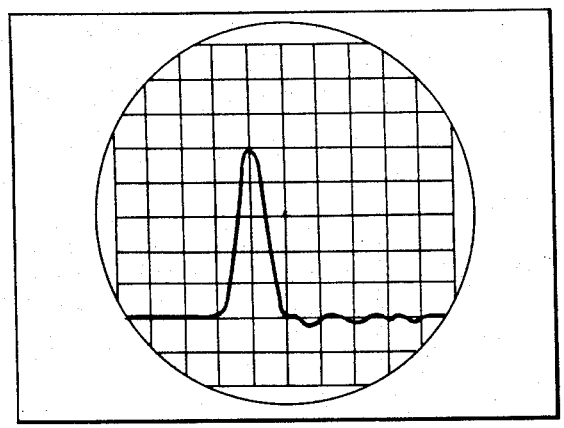
FIG. 6 is a picture of an oscillogram of an output pulse.

FIG. 6 is a picture of an oscillogram obtained from an operating embodiment of the invention. The grid scale is 0.2 nanosecond per division.

In using this invention for generating narrow pulses it should be noted that the output impedance from the apparatus is not exactly the characteristic impedance of the output TEM mode element. That is, referring to the specific embodiment that has been set forth in connection with FIG. 2, the output impedance of the pulse generator at terminals 19 and 20 is not fifty ohms. Thus, with $R_L$ at 6 a nominal fifty-ohm load, there will tend to be some reflections from the input of the device under test that will cause re-reflections to appear at the output of the pulse generator. To avoid these re-reflections from interfering with the device under test, the length of the line 14 (or coaxial cable 4) and any other connecting line from the generator to the device under test, may be chosen of such a physical length as to make the round trip delay from the stub juncture to the input to the device under test longer than the expected transient response of the device under test. Practically, this problem is of little concern because the transients to be observed in equipment tested with the extremely short pulse of this disclosed device will generally be of less than 10 nanoseconds in duration and normal line lengths will be such that any re-reflections tending to occur will be much later in time. As previously stated, transmission elements 13 and 14 (and likewise 3 and 4) may be any arbitrary length, however, it is to be understood that the time delay incurred between the onset of the step function at terminals 17 and 18, and the onset of the energizing pulse at terminals 19 and 20 will be dependent upon the total length of the enumerated transmission elements and the velocity of TEM wave propagation in them. Theoretically, the transmission elements may approach zero as a limiting minimum length, but practically this would be very difficult as some length of transmission means must be employed to connect the step wave generator to the device under test.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. A pulse generating system for generating a narrow pulse of determined time width, the said system comprising: means having a determined impedance for generating a step wave; a first coaxial transmission means having a determined characteristic impedance value approximately equal to the said determined impedance of said step wave generating means for receiving said step wave, and having a terminal juncture point; shorted stub terminated coaxial transmission means providing a reflective element having a determined characteristic impedance approximately equal in value to one-half the impedance value of the said first coaxial transmission means and having an electrical one-way transit time length approximately equal to one-half the said determined time width of the generated narrow pulse, connected to the said first coaxial transmission means at the said terminal juncture point; and a second coaxial transmission means having a characteristic impedance value approximately equal to the said characteristic impedance value of the said first coaxial transmission means, and having an output connection, connected to the said terminal juncture point for conducting the said narrow pulse from the said juncture point to the said output connection.

2. The pulse generating system of claim 1 wherein the said second coaxial transmission means has a physical length at least fifty times the physical length of the said shorted stub terminated coaxial transmission means.

3. A pulse generating system for generating a narrow pulse of determined time width, the said system comprising: means having a determined impedance for generating a step wave; a strip transmission line means having input and output terminals, the said input terminals connected to the said step wave generating means, and the said strip transmission line having a characteristic impedance value approximately equal to the said determined impedance of the step wave generating means; and shorted stub strip transmission line means having a determined characteristic impedance approximately equal in value to one-half the said impedance value of the said strip transmission line and having an electrical one-way transit time length approximately equal to one-half the said determined time width of the generated narrow pulse connected across the said transmission line intermediate its input and output terminals for providing a narrow pulse of the said determined time width at the said output terminals in response to the said generated step wave.

References Cited

UNITED STATES PATENTS

| | | | |
|---|---|---|---|
| 2,659,052 | 11/1953 | Bess | 333—20 XR |
| 2,968,011 | 1/1961 | Schouten et al. | 333—20 |
| 2,444,438 | 7/1948 | Grieg | 333—20 |
| 2,465,840 | 3/1949 | Blumlein | 333—20 |
| 2,552,160 | 5/1951 | Espley | 333—20 |
| 2,769,101 | 10/1956 | Drosd | 307—108 |
| 2,863,072 | 12/1958 | Alexander | 307—106 |

FOREIGN PATENTS 1,006,472   4/1957   Germany.

OTHER REFERENCES

"Pulse and Digital Circuits," Millman and Taub, McGraw-Hill Book Company, Inc., New York, 1956, page 302 relied upon.

"Electronic Measurements," Terman and Pettit, McGraw-Hill Book Company, Inc., 1952, TK7835 T38, pages 561–563 relied upon.

HERMAN KARL SAALBACH, *Primary Examiner.*

M. NUSSBAUM, *Assistant Examiner.*